Jan. 10, 1928.
J. D. HIRES
1,655,789
AUTO AWNING
Filed Dec. 23 1926
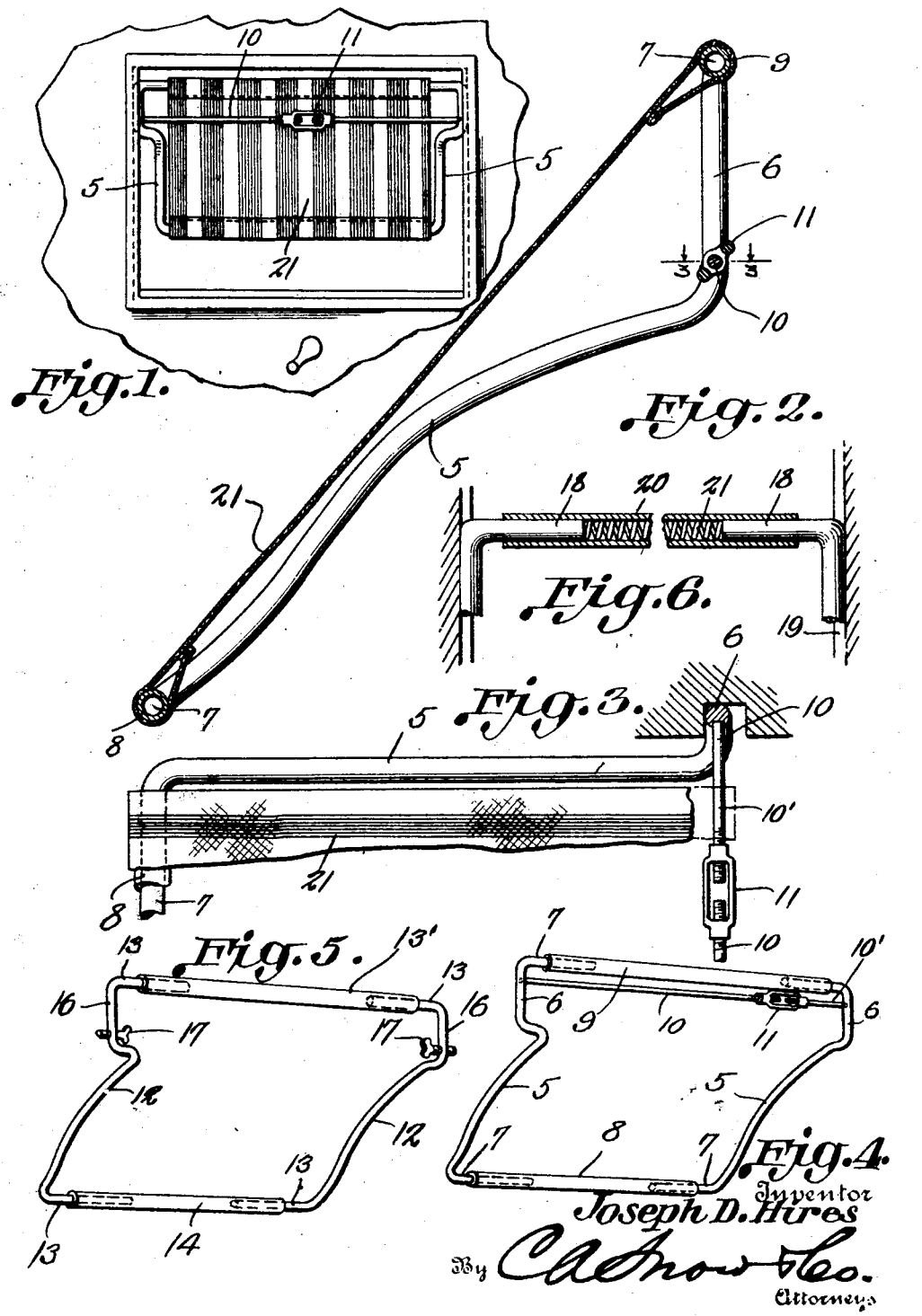
Inventor
Joseph D. Hires
By C. A. Snow & Co.
Attorneys Patented Jan. 10, 1928.

1,655,789

UNITED STATES PATENT OFFICE.

JOSEPH D. HIRES, OF LUXORA, ARKANSAS.

AUTO AWNING.

Application filed December 23, 1926. Serial No. 156,693.

This invention relates to a novel form of sun shield or awning especially designed for use in connection with motor vehicles of the closed type.

An important feature of the invention is to provide a device of this character so constructed that it may be secured within the usual sash grooves or guides of a motor vehicle window construction, eliminating the necessity of forming openings in the frame of the window to secure the device.

Another important object of the invention is to provide a device which may be readily and easily removed and stored, eliminating the necessity of employing a mechanic to install or remove the device.

A still further object of the invention is to provide a device which will not twist or move within the window guides, under wind pressure.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a rear elevational view of a device constructed in accordance with the invention and showing the same as installed.

Figure 2 is a sectional view through the frame and covering.

Figure 3 is a fragmental sectional view taken on line 3—3 of Figure 2.

Figure 4 is a perspective view of the frame.

Figure 5 is a perspective view of another form of frame securing means.

Figure 6 is a fragmental elevational view partly in section of another form of the invention.

Referring to the drawing in detail, the device embodies a frame comprising side members 5 having upstanding offset portions 6, the ends of the side members extending inwardly as at 7.

The upper inwardly extended portions 7 are connected by means of the tubular member 9, while the lower inwardly extended ends 7 of the side members are connected by means of the tubular member 8, the connections between the side members and tubular members being such as to permit of lateral movement of the side members to adjust the device for use in window frames of various widths.

It will also be seen that the offset portions which are indicated at 9' provide for a clearance so that the offset portions may fit within the usual guides formed within a window frame.

The reference character 10 indicates a rod which has one of its ends connected with one of the offset portions 9' while the rod 10' has one of its ends connected with the offset portion 9' at the opposite side of the awning frame, the inner or adjacent ends of the rods 10 and 10' being threaded to receive the turn buckle 11 for securing the side members in predetermined spaced relation with each other.

In the form of the invention as illustrated by Figure 5, the side members 12 are also constructed with inwardly extended end portions, the inwardly extended end portions at the upper end of the frame being positioned in the ends of the tubular member 13, while the lower inwardly extended end portions are positioned in the ends of the tubular member 14.

The side members in this form of the invention also have offset portions 16 which are provided with threaded openings to receive the winged screws 17 that are adapted to fit in suitable openings formed in the grooves of the window in which the awning frame is positioned to secure the awning frame against movement.

A further modified form of the invention is shown by Figure 6 of the drawing in which the inwardly extended end portions 18 of the side members 19 are positioned within the tubular member 20, there being provided a coiled spring 21 located within the tubular member 20 adapted to normally exert a lateral pressure on the side members 19 to cause them to be held by friction within the grooves of the window frame.

The awning proper which is indicated at 21 may be made of any suitable material, the same having its ends formed with hems to accommodate the tubular members of the awning frame.

I claim:

An awning frame for positioning in window frames, embodying side members, each of the side members having their upper extremities bent to provide lateral offset portions, manually controlled means supported by the lateral offset portions for securing the side members in position in a window frame, and said side members at each end having right angled extremities disposed towards each other, and tubular members adapted to be positioned over the upper and lower right angled extremities respectively to secure the side members together.

In testimony that I claim the foregoing as my own, I have hereto affixed my signature.

JOSEPH D. HIRES.